United States Patent
Hou et al.

(10) Patent No.: US 10,101,087 B2
(45) Date of Patent: Oct. 16, 2018

(54) METHOD OF COMPREHENSIVELY UTILIZING HIGH-TEMPERATURE SLAG BALLS EXITING ROTARY KILN IN KILN PROCESS FOR PRODUCING PHOSPHORIC ACID, AND PROCESS SYSTEM THEREOF

(71) Applicant: SICHUAN KO CHANG TECHNOLOGY CO., LTD, Chengdu (CN)

(72) Inventors: Yonghe Hou, Chengdu (CN); Jiabin Wang, Chengdu (CN); Shenghui Lei, Chengdu (CN); Jing Li, Chengdu (CN)

(73) Assignee: SICHUAN KO CHANG TECHNOLOGY CO., LTD., Chengdu (CN)

( * ) Notice: Subject to any disclaimer, the term of this patent is extended or adjusted under 35 U.S.C. 154(b) by 178 days.

(21) Appl. No.: 14/958,884

(22) Filed: Dec. 3, 2015

(65) Prior Publication Data
US 2016/0084575 A1    Mar. 24, 2016

Related U.S. Application Data

(63) Continuation of application No. PCT/CN2013/081185, filed on Aug. 9, 2013.

(30) Foreign Application Priority Data

Jun. 4, 2013 (CN) .......................... 2013 1 0218600

(51) Int. Cl.
*C01B 25/20* (2006.01)
*F27B 7/38* (2006.01)
(Continued)

(52) U.S. Cl.
CPC .............. *F27B 7/383* (2013.01); *C01B 25/20* (2013.01); *F27B 7/38* (2013.01); *F27D 15/0206* (2013.01);
(Continued)

(58) Field of Classification Search
None
See application file for complete search history.

(56) References Cited

U.S. PATENT DOCUMENTS 1,359,211 A * 11/1920 Washburn ............... C01B 25/20
                                                           204/164
3,092,473 A   6/1963 Koontz
                (Continued)

FOREIGN PATENT DOCUMENTS

| CN | 1026403 C | 11/1994 |
| CN | 1040199 C | 10/1998 |

(Continued)

OTHER PUBLICATIONS

International Search Report in international application No. PCT/CN2013/081185, dated Mar. 6, 2014.
(Continued)

*Primary Examiner* — Wayne A Langel
(74) *Attorney, Agent, or Firm* — Syncoda LLC; Feng Ma; Junjie Feng

(57) ABSTRACT

A method and process system of comprehensively utilizing high-temperature slag balls exiting a rotary kiln in a kiln process for producing phosphoric acid, comprising a rotary kiln, a cooling device and a dryer for composite green pellets in a kiln process for producing phosphoric acid, wherein the cooling device comprises at least two cooling stages; the high-temperature slag balls are first conveyed to the cooling device, then the cooling device carries slag balls successively to multiple cooling stages by the movement of a trolley, each cooling stage introduces cold air for cooling, a part of the hot air after cooling is sent to the cavity of the rotary kiln, and the other part thereof is sent to the dryer for composite green pellets in the kiln process for producing phosphoric acid for drying.

9 Claims, 9 Drawing Sheets

(51) Int. Cl.
*F27D 15/02* (2006.01)
*F27D 9/00* (2006.01)
(52) U.S. Cl.
CPC ....... *F27D 2009/007* (2013.01); *Y02P 20/124* (2015.11)

(56) References Cited

U.S. PATENT DOCUMENTS

| | | | |
|---|---|---|---|
| 3,298,679 | A | 1/1967 | Krautheim |
| 3,531,095 | A | 9/1970 | Frans |
| 4,351,809 | A | 9/1982 | Megy |
| 4,389,384 | A | 6/1983 | Hard |
| 4,870,913 | A | 10/1989 | Schneider |
| 5,322,434 | A | 6/1994 | Milewski |
| 7,093,457 | B2 | 8/2006 | Foresman |
| 7,378,070 | B2 | 5/2008 | Megy |
| 7,910,080 | B2 | 3/2011 | Megy |
| 2011/0109021 | A1 | 5/2011 | Cain |

FOREIGN PATENT DOCUMENTS

| | | |
|---|---|---|
| CN | 1584477 A | 2/2005 |
| CN | 101020574 A | 8/2007 |
| CN | 101624647 A | 1/2010 |
| CN | 201397051 Y | 2/2010 |
| CN | 102235820 A | 11/2011 |
| CN | 102583477 A | 7/2012 |
| EP | 1 021 692 B2 | 7/2005 |
| JP | 2001062424 A | 3/2001 |
| WO | 2011056343 A1 | 5/2011 |

OTHER PUBLICATIONS

English Translation of the Written Opinion of the International Search Authority in international application No. PCT /CN2013/081185, dated Mar. 6, 2014.
Zhang, Yimin et al., Pellet Production Technology, Aug. 2005, pp. 87-89, ISSN7-5024-3760-6.
"Allis Mineral Systems Pyro Systems Division Induration of Taconite Pellets Using a Grate-Kiln System at Minntac," Aug. 17, 1991—Skilling Mine Review.
"Metso Grate-Kiln System for Iron Ore Pelletizing EN" (2010).
Tip Fowler in "FINDS 4Q2010".
Joseph Megy in Fertilizer International May-Jun. 2008.
"Belt Drier and Coolers"—Kahl attachment—Jun. 2010.
Leder, Ind. Eng. And Chem. Process Design and Development, 24(3), pp. 688-697, 1985.
Perry's Chemical Engineers' Handbook, Sixth Edition, pp. 20-33 through 20-37—1984.
Akwasi A. Boateng, "Rotary Kilns: Transport Phenomena and Transport Processes," Elsevier 2008, pp. 18-24.
Ricardo Mosci, 9 Lining Thickness—SlideShare, www.slideshare. net/RicardoMosci/9-lining-thickness—Nov. 3, 2012.
Harbison-Walker Handbook of Refractory Practice, 2005, pp. IR-13-IR-16.

\* cited by examiner

METHOD OF COMPREHENSIVELY UTILIZING HIGH-TEMPERATURE SLAG BALLS EXITING ROTARY KILN IN KILN PROCESS FOR PRODUCING PHOSPHORIC ACID, AND PROCESS SYSTEM THEREOF

CROSS-REFERENCE TO RELATED APPLICATION

The application is a continuation of PCT/CN2013/081185 (filed on Aug. 9, 2013), which claims priority from CN Patent Application Serial No. 201310218600.0 (filed on Jun. 4, 2013), the entire contents of which are incorporated herein by reference for all purposes.

FIELD OF THE INVENTION

The present invention relates to recovery of slag ball resources in a phosphate ore reduction process, and particularly to a method of cooling and comprehensively utilizing slag balls exiting a rotary kiln in a kiln process for producing phosphoric acid.

BACKGROUND OF THE INVENTION

There are chiefly two processes for producing phosphoric acid in industry. (1) producing phosphoric acid with a wet process: using sulfuric acid to decompose phosphate ore to obtain dilute phosphoric acid and solid slag (briefly called phosphogypsum) with $CaSO_4 \cdot nH_2O$ as a main component, and concentrating the dilute phosphoric acid to obtain wet-process phosphoric acid with about 54% phosphoric acid. This process has the following major drawbacks: the first drawback is large consumption of sulfuric acid; the second drawback is that the slag phosphogypsum cannot be used effectively, and sulfuric acid, phosphoric acid and soluble fluorides entrained therein are all soluble in water, and rain wash of the slag piled in the nature is apt to cause serious pollution to the environment; the third drawback is that the resultant phosphoric acid contains higher content of impurities and is generally only used to produce fertilizer; and the fourth drawback is that high-grade phosphate ore must be used to ensure economy of the product. (2) producing phosphoric acid with a hot process: first, placing phosphate ore, silica and carbonaceous solid reducing agent in an ore-smelting electric furnace, raising a temperature in the furnace to 1300 with energy of electric arc formed by electrical short-circuiting, reducing phosphor in the phosphate ore in the form of $P_4$, meanwhile converting carbonaceous solid reducing agent into CO, washing gas mainly containing $P_4$ and CO discharged out of the ore-smelting electric furnace with water, cooling $P_4$ into solid to separate from gas phase to obtain the product yellow phosphorus, igniting and burning exhaust gas containing CO at an outlet of a chimney and exhausting to the atmosphere; heating the obtained $P_4$ to 80 to change it into liquid phase, subjecting it to oxidization combustion reaction with introduced air in a hydration tower to obtain phosphoric anhydride $P_2O_5$, and then absorbing it with water to obtain phosphoric acid. The hot-process production of phosphoric acid has the following main drawbacks: the first drawback is large consumption of electrical energy; the second drawback is that gas discharged out of the ore-smelting electric furnace, from which $P_4$ is already separated, still entrains a large amount of fluorides (existing in the form of $SiF_4$ and HF) and a small amount of un-deposited gas $P_4$, which causes serious pollution to the atmospheric environment; the third drawback is that gas containing a large amount of CO is directly burnt and exhausted, which causes large waste of energy; the fourth drawback is that high-grade phosphate ore needs to be used to ensure economy of the production.

To overcome impact on production of phosphoric acid exerted by shortage of electrical energy, insufficient pyrites resources and gradual reduction of high-grade phosphate core, Occidental Research Corporation of the United States proposed a KPA process in 1980's, i.e., a process of producing phosphoric acid with a rotary kiln (briefly called a phosphoric acid producing process with a kiln) (see Frederic Ledar and Won C. Park, et al., New Process for Technical-Grade Phosphoric Acid, Ind. Eng. Chem. Process Des. Dev 1985, 24, 688-697), and carried out a pilot experiment of a pilot device in a 0.84 m (inner)×9.14 m (see the US patent document U.S. Pat. No. 4,389,384). According to this process, phosphate ore, silica and carbonaceous reducing agent (coke powder or coal powder) are co-ground so that 50%-85% pass 325 mesh, with 1% bentonite being added to produce balls, which are dried and preheated by a chain-type dryer and then delivered into a rotary kiln with a kiln head in which natural gas is burnt, pellets are reduced in the kiln, a maximum solid temperature is controlled as 1400-1500, pellet $CaO/SiO_2$ mole ratio is adjusted as 0.26-0.55 so that the a melting point of the pellet is higher than a carbon thermal reduction temperature of the phosphate core in the pellets, phosphor is reduced and volatiles out of the pellets in the form of phosphoric vapor, and then oxidized by air introduced in a middle space of the kiln into phosphorous pentoxide, heat resulting from oxidization is then supplied to the reduction reaction, and finally kiln gas containing phosphorous pentoxide is hydrated and absorbed to obtain phosphoric acid.

The idea of the above processing phosphoric acid with a kiln exhibits an excellent industrial application prospect because its principle is to form $P_4$ gas using carbon thermal reduction of the phosphate ore, transfer phosphorus in the phosphate ore to gas phase of the rotary kiln, use a gas-solid separation principle to enable phosphorus to be well separated from other solid substances in the balls, allow the $P_4$ gas transferred into the gas phase of the rotary kiln to go through an oxidization heat liberation reaction with oxygen in the gas phase of the rotary kiln to generate $P_2O_5$, supply the liberated heat to carbon thermal reduction (endothermic reaction) of the phosphate ore in the material balls, and finally hydrate and absorb the kiln gas containing $P_2O_5$ exiting the rotary kiln to obtain industrial phosphoric acid having a cleanliness much higher than the phosphoric acid produced with the wet process. Since the rotary kiln uses primary energy to maintain phosphate ore carbon terminal reduction temperature, and meanwhile flammable substance $P_4$ generated from the phosphate ore carbon terminal reduction and CO are subjected to the combustion heat liberation reaction in the interior of the rotary kiln to replenish the energy needed to maintain the phosphate ore carbon terminal reduction temperature in the rotary kiln, this process substantially reduces energy consumption as compared with the conventional hot process of producing phosphoric acid.

However, the research indicates that it is very difficult to implement the process of producing phosphoric acid with the kiln in large-scale industrial application and practice and its main drawbacks are as follows:

1. A rotary kiln is an apparatus with a kiln body rotating at a certain speed (0.5 r/min-3 r/min), and it is advantageous in continuously performing mechanical turn and mixture of a solid material fed into the kiln to ensure uniformity of heat reception of the solid material at all locations in the kiln.

However, the solid material in the kiln must bear a mechanical frictional force resulting from movement of the material. If a strength of the material is smaller than the received mechanical frictional force, the material can be easily destroyed. A basic principle of the KPA process proposed by ORC corporation is to co-grind the phosphate ore, the silica and the carbonaceous reducing agent (coke powder or coal powder) so that 50%-85% of the co-ground materials pass 325 mesh, and then produce them into pellets, the three kinds of substances must be closely copolymerized into a whole so that the mixture does not melt at the carbon thermal reduction temperature of the phosphate ore under the condition the $CaO/SiO_2$ mole ratio in the mixture is 0.26-0.55, and meanwhile carbon reduction of the phosphate ore can be performed smoothly. However, since the reducing agent carbon is added to the material pellets used in the process, carbon goes through quick oxidation reaction with oxygen in air at a temperature greater than 350 to produce $CO_2$. If a conventional method of consolidating pellets at a high temperature at a chain grate in the metallurgical industry is employed, the reducing carbon in the pellets will be all oxidized, the pellets entering the rotary kiln will lose the reducing agent, carbon thermal reduction reaction of the phosphorus naturally cannot be performed, and the process fails as a result. If only the bentonite is added as a bonding agent of the pellets to perform drying and dehydration at a temperature less than 300, an anti-pressure strength of the pellets is only about 10KN per ball, with a falling strength≤one time per meter; since an acting mechanism of the bentonite is mainly to use interlayer water in its substance structure to adjust a moisture content release speed during the drying of the pellets and improve a burst temperature of the pellets during the drying, and bentonite itself does not play a remarkable role in improving the strength of the pellets. After such pellets are fed into the rotary kiln and before the rotary kiln temperature value reaches 900, since the pellets entering the kiln cannot bear the mechanical frictional force resulting from movement of material balls in the pellets, a lot of said pellets are pulverized, and thereafter the phosphate ore powder, silica powder and carbonaceous reducing agent forming the pellets will separate, the phosphate ore powder after pulverization causes failure of reduction of phosphorus as it cannot get in close contact with carbonaceous reducing agent. More seriously, once the phosphate ore powder separates from silica powder, its melting point abruptly falls below 1250. When such powder-like phosphate ore passes through a high-temperature reducing area (with a material layer temperature of 1300 or so) of the rotary kiln, it will totally changes from solid phase into a liquid phase, and thereby adheres to a liner of the rotary kiln to form high-temperature ringing of the rotary kiln, which hinders normal rotation of the materials in the rotary kiln so that a majority of materials added into the rotary kiln overflows from the rotary kiln from a feeding end of the rotary kiln, high-temperature reduction of phosphorus cannot be achieved and the process fails. It can be seen that the raw materials entering the kiln have their intrinsic drawbacks, any industrialized, large-scale or commercialized application of the above-mentioned KPA technology has not yet been witnessed so far.

2. Regarding the KPA process with the phosphate ore pellets with carbon being added, a solid material area below a material layer in the rotary kiln belongs to a reduction zone, and a gas flow area of the rotary kiln is above the material layer and belongs to an oxidization zone, the feed pellets are added from a kiln tail of the rotary kiln and discharged out of a kiln head of the rotary kiln by virtue of its own gravity and a frictional force resulting from rotation of the rotary kiln, a burner for burning fuel in the rotary kiln is mounted at the kiln head of the rotary kiln, fume resulting from the burning is introduced out by a blower at the kiln tail, a micro negative pressure is maintained in the rotary kiln, and the gas flow is opposite to a movement direction of the materials. Since there is not a mechanical isolation area between the reduction zone (solid material layer area) and the oxidization zone (the gas flow area above the solid material layer area of the rotary kiln) of the rotary kiln, the material balls exposed on the surface of the solid material layer area and $O_2$, $CO_2$ in the gas flow in the oxidization zone are subjected to convective mass transfer; on the one hand, this causes the reducing agent in the material balls to be partially oxidized before the material balls are heated by the gas flow heat transfer to the carbon reduction temperature of the phosphate ore so that the material balls are not sufficiently reduced due to shortage of carbonaceous reducing agent in the reduction zone of the rotary kiln; more seriously, the material balls exposed to the surface of the material layer at the high-temperature area of the rotary kiln is further subjected to chemical reaction with $P_2O_5$ already generated from reduction in the kiln gas to produce calcium metaphosphate, calcium phosphate and other metaphosphates or phosphates, thereby causing the phosphorus already reduced into the gas phase to return to the material balls again and form a layer of white crust rich in $P_2O_5$ on the surface of the material balls, the layer of crust generally having a thickness of 300 μm-1000 μm, the content of $P_2O_5$ in the layer of crust topping 30%; as a result, $P_2O_5$ transferred from the material balls to the gas phase does not exceed 60%, which cause a lower yield ratio of $P_2O_5$ in the phosphate ore and thereby causes waste of mineral resources and large rise of the phosphoric acid production cost so that the above KPA process losses value in respect of commercial application and industrial spread. Researchers desire gas volatized from the material layer to isolate the reduction zone from the oxidization zone in the rotary kiln, but industrial experiments performed in a rotary kiln with an inner diameter 2 m show that the phenomena of white crust rich in $P_2O_5$ on the surface of the pellets still cannot be avoided.

Due to the above-mentioned technical drawbacks, it is still very difficult to use the KPA process proposed by ORC in large-scale industrial application and practice to produce phosphoric acid.

Joseph A. Megy proposes some improved technical methods with respect to the KPA process (see patent document U.S. Pat. No. 7,910,080B), i.e., on the premise of maintaining the basis process of KPA unchanged, providing a material stopping ring on a kiln head material discharging end of the cylinder of the rotary kiln to improve a solid material filling rate of the rotary kiln, and meanwhile increasing the diameter of the rotary kiln to reduce a surface area to volume ratio of an inner material layer of the rotary kiln, reduce probability of the material of the material layer being exposed to the surface of the solid material layer to shorten the time that the reducing agent carbon in the material balls is oxidized by $O_2$ in the kiln gas in the rotary kiln, reduce burn of the reducing agent carbon before the material balls reach the reduction zone of the rotary kiln and meanwhile decease generation of phosphates or metaphosphates on the surface of the material balls in the high-temperature area of the rotary kiln. In addition, according to the process, it is desired that partial petrol coke is added to the materials entering the rotary kiln so that reducing gas generated by a volatile matter in the petrol coke due to heat reception and volatilization is used to cover between the material layer and the gas flow oxidization area of the rotary kiln to further block the probability of the $O_2$ and $P_2O_5$ in the gas flow in the rotary kiln reacting with the material balls to ensure normal operation of the process. However, increase of the filling rate of the rotary kiln allows the material balls to bear larger mechanical frictional force in the rotary kiln, thereby causing a larger proportion of pulverization of the material balls in the rotary kiln, and forming more substances with a melting point lower than the phosphate ore carbon thermal reduction temperature so that the high-temperature ringing of the rotary kiln becomes quicker and more serious and earlier failure of the process is caused. In addition, the volatile matter generated by added small amount of petrol coke is not sufficient to produce sufficient gas and it is difficult to form an effective isolation layer between the solid material layer of the rotary kiln and the gas flow area in the rotary kiln. If an excessive amount is added, the materials in the rotary kiln will entrain a large amount of fuel so that in a slag ball cooling machine in the subsequent process, the redundant fuel is confronted with the air for cooling the slag balls and burns rapidly, a large amount of heat resulting from the burning not only increases the difficulty in cooling the high-temperature slag balls exiting the rotary kiln but also substantially improves the production cost of the process and makes implementation of the commercialized and large-scale application of the process impossible.

However, KPA process still presents a series of technical problems, e.g., the high-temperature slag balls out of the rotary kiln after the completed release of $P_2O_5$ need to be cooled more effectively, the thermal energy upon cooling need to used effectively to reduce the energy consumption in the process of producing phosphoric acid with a kiln; and the cooled slag balls are discharged out directly, this not only causes pollution to the environment, but also causes large waste of resources which are of a price. Efficient solution to these problems directly affects the industrial application value and economy of the process of producing phosphoric acid with a kiln.

SUMMARY OF THE INVENTION

The present invention provides a cooling device for cooling high-temperature slag balls exiting the rotary kiln in the kiln process for producing phosphoric acid, which exhibits a simple structure, smaller investment, lower cost and a better cooling effect, and further provide a method of using the above cooling device to comprehensively utilize slag balls exiting the rotary kiln in the kiln process for producing phosphoric acid, which can reduce energy consumption and resource consumption, reduce environment pollution, substantially improve economic benefits and environmental protection benefits of the kiln process for producing phosphoric acid.

The present invention provides a method of comprehensively utilizing high-temperature slag balls exiting the rotary kiln in the kiln process for producing phosphoric acid, comprising the following steps:

(1) Delivering high-temperature slag ball exiting the rotary kiln in the kiln process for producing phosphoric acid to a feed area of a cooling device; the cooling device is divided into at least two interconnected cooling stages;

(2) Bringing the high-temperature slag balls into the first cooling stage; after heat exchange in the first cooling stage, using the hot air as a hot air source for burning a reduction reaction product in the rotary kiln;

(3) Bringing the high-temperature slag balls from the first cooling stage to the second cooling stage; after heat exchange of the second stage cooling stage, using the hot air as a hot air source for drying the composite green pellet;

(4) Discharging the cooled slag balls from the unload area.

The present invention further provides a system for comprehensively utilizing high-temperature slag balls exiting a rotary kiln in the kiln process for producing phosphoric acid, the process system comprising a rotary kiln, a cooling device and a dryer for composite green pellets in the kiln process for producing phosphoric acid; the cooling device is divided into at least two interconnected cooling stages.

Each cooling stage is provided with a cold air inlet and a hot air outlet corresponding thereto; a gas flow passage between the cold air inlet and the hot air outlet passes through the trolley; a movement trajectory of the trolley passes by the feed area, a plurality of cold air inlets and the unload area in turn.

The cooling stage comprises a first cooling stage adjacent to the feed area and a second cooling stage adjacent to the first cooling stage, a first hot air outlet disposed in the first cooling stage is connected to a cavity of the rotary kiln via a first hot air delivery pipe; a second hot air outlet correspondingly disposed in the second cooling stage is connected to the cavity of the dryer via a second hot air delivery pipe.

DETAILED DESCRIPTION OF THE INVENTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

In an embodiment of the present invention, the method of comprehensively utilizing high-temperature slag balls exiting the rotary kiln in the kiln process for producing phosphoric acid, comprising the following steps:

(1) Delivering high-temperature slag ball (slag balls from which $P_2O_5$ is totally released and which temperature generally reaches 1000-1300) exiting the rotary kiln in the kiln process for producing phosphoric acid to a feed area of a cooling device, the cooling device comprises a supporting device, a trolley and a housing, the trolley is located on the supporting device, the housing is erected above the trolley, a grid plate is disposed on the trolley, the feed area and a unload area of the cooling device are both communicated with the trolley, and the high-temperature slag balls are delivered onto the trolley of the cooling device; the cooling device is divided into at least two interconnected cooling stages, each cooling stage is provided with a cold air inlet and a hot air outlet corresponding thereto; a gas flow passage between the cold air inlet and the hot air outlet passes through the grid plate on the trolley; a movement trajectory of the trolley passes by the feed area, a plurality of cold air inlets and the unload area in turn;

(2) The trolley rotates to bring the high-temperature slag balls into the first cooling stage in which a blower below the trolley is used to introduce cold air in from the cold air inlet, the cold air passes through the trolley located in the first cooling stage and its grid plate and performs heat exchange with the hot slag balls on the trolley and meanwhile residual carbon not used in the reaction in the high-temperature slag balls burns away; after heat exchange in the first cooling stage, hot air discharged out of the first hot air outlet corresponding to the first cooling stage is delivered through a first hot air delivery pipe to a kiln head box or the rotary kiln and then into a cavity of the rotary kiln as a hot air source for burning a reduction reaction product in the rotary kiln (specifically as combustion-supporting air for burning phosphorus and CO);

(3) The trolley rotates to bring the high-temperature slag balls from the first cooling stage to the second cooling stage in which a blower below the trolley is used to introduce cold air in from the cold air inlet, the cold air passes through the trolley located in the second cooling stage and its grid plate and performs heat exchange with the hot slag balls on the trolley; after heat exchange of the second stage cooling stage, hot air discharged out of the second hot air outlet corresponding to the second cooling stage is delivered through a second hot air delivery pipe into a composite green pellet dryer in the kiln process for producing phosphoric acid, as a hot air source for drying the composite green pellet;

(4) The trolley, through rotation, further brings the high-temperature slag balls from the second cooling stage to the remaining cooling stages in which the blower below the trolley is used to introduce cold air in from the cold air inlet, the cold air passes through the trolley located in the remaining cooling stages and its grid plate and performs heat exchange with the hot slag balls on the trolley; after heat exchange in the remaining cooling stages, hot air discharged out of remaining hot air outlets, after being dedusted, may be directly discharged or delivered into the composite green pellets dryer in the kiln process for producing phosphoric acid, as a hot air source for drying the composite green pellet; the cooled slag balls are discharged from the unload area.

In an embodiment of the present invention, high-temperature slag ball exiting the rotary kiln is totally released from $P_2O_5$ and the temperature of slag ball generally reaches 1000-1300.

In an embodiment of the present invention, a temperature of hot air discharged out of the first hot air outlet is controlled above 600, and a temperature of hot air discharged out of the second hot air outlet is controlled above 350. Generally, after going through the cooling of the last cooling stage, the temperature of the slag balls may be reduced to 100, and the temperature of hot air at the outlet of the last cooling stage is generally less than 150.

In an embodiment of the present invention, the dryer is a scale plate dryer, the scale plate dryer is divided into a total of three drying stages in a delivery direction of the composite green pellets including a low-temperature drying stage, an intermediate-temperature drying stage and a high-temperature drying stage; hot air discharged out of the second hot air outlet is delivered through the second hot air delivery pipe to the intermediate-temperature drying stage and/or high-temperature drying stage;

Hot air entering the intermediate-temperature drying stage, after being moderated by the replenished cold air, becomes intermediate-temperature hot air at a temperature in a range of 150-250; through up-down air pumping or down-up wind blowing, the intermediate-temperature hot air vertically passes through the material layer and performs through-drying for the composite green pellets;

Hot air entering the high-temperature drying stage, after being moderated by the replenished cold air, becomes high-temperature hot air at a temperature in a range of 200-350; through up-down air pumping or down-up wind blowing, the high-temperature hot air vertically passes through the material layer and performs through-drying for the composite green pellets;

The low-temperature hot air in a range of 100-200 is introduced into the low-temperature drying stage; through up-down air pumping or down-up wind blowing, the low-temperature hot air is made vertically pass through the material layer and perform through-drying for the composite green pellets; since the temperature of hot exhaust gas at the outlet of the high-temperature drying stage may reach 100-200 (150 or so), the low-temperature hot air originates from exhaust gas discharged at the high-temperature hot air outlet of the high-temperature drying stage; with partial moisture content being removed in the low-temperature drying stage, a drying load in the subsequent intermediate-temperature and high-temperature drying stages may be lessened effectively so as to minimize energy consumption for drying the component green pellet per unit weight, and meanwhile raise a lower limit of a pellet burst temperature during the drying of the pellets.

In an embodiment of the present invention, being discharged out of the unload area, the cooled slag balls are used as artificial ceramsites which are directly used as architecture material or used for planting and culturing flowers and green plants; or the cooled slag balls are ground so that above 80 percent of the ground material passes a 100 mesh, and then used as an active material for manufacturing concrete or a blending material for manufacturing cement.

In an embodiment of the present invention, the cooling device might be an annular cooler or a belt-type cooler, the cold air inlet is disposed below the trolley, and the hot air outlet is disposed above the trolley, or the hot air inlet is disposed below the trolley, and the cold air outlet is disposed above the trolley. The annular cooler is divided into at least two interconnected cooling stages in a circumferential direction; respective cooling stages are separated by a partition plate. The belt-type cooler is divided into at least two interconnected cooling stages in a lengthwise direction; respective cooling stages are separated by a partition plate. The first hot air outlet is disposed in the first cooling stage adjacent to the feed area, the second hot air outlet is disposed in the second cooling stage adjacent to the first cooling stage, and a corresponding hot air outlet is disposed in the remaining cooling stages adjacent to the second cooling stage. In another embodiment of the present invention, the annular cooler is divided into 2-5 cooling stages, and the cooling stages may be equal lengths.

In another embodiment of the present invention, the belt-type cooler is divided into 2-5 cooling stages, and the cooling stages may be equal lengths.

In an embodiment of the present invention, the present invention further provides a process system for comprehensively utilizing high-temperature slag balls exiting a rotary kiln in the kiln process for producing phosphoric acid, the process system comprising a rotary kiln, a cooling device and a dryer for composite green pellets in the kiln process for producing phosphoric acid;

The cooling device comprises a supporting device, a trolley and a housing, the trolley is located on the supporting device, the housing is erected above the trolley, the feed area and a unload area of the cooling device are both communicated with the trolley, the cooling device is divided into at least two interconnected cooling stages, each cooling stage is provided with a cold air inlet and a hot air outlet corresponding thereto; a gas flow passage between the cold air inlet and the hot air outlet passes through the trolley; a movement trajectory of the trolley passes by the feed area, a plurality of cold air inlets and the unload area in turn;

The cooling stage comprises a first cooling stage adjacent to the feed area and a second cooling stage adjacent to the first cooling stage, a first hot air outlet disposed in the first cooling stage is connected to a cavity of the rotary kiln via a first hot air delivery pipe; a second hot air outlet correspondingly disposed in the second cooling stage is connected to the cavity of the dryer via a second hot air delivery pipe.

In an embodiment of the present invention, the dryer is a scale plate dryer, the scale plate dryer is divided into a total of three drying stages in a delivery direction of the composite green pellets including a low-temperature drying stage, an intermediate-temperature drying stage and a high-temperature drying stage; the second hot air delivery pipe is connected to the intermediate-temperature drying stage and/or high-temperature drying stage; the air inlet of the low-temperature drying stage is communicated with the high-temperature hot air outlet of the high-temperature drying stage via a delivery pipe.

In an embodiment of the present invention, the rotary kiln comprises a kiln body, a kiln head box, a kiln tail box and a driving device for driving the kiln body to rotate, at the kiln head of the kiln body is provided a fuel burner, at the kiln tail box are provided a feed pipe and an outlet flue connected to an external hydration tower, an upper portion of the kiln body is not provided with a wind tube, the outlet flue is disposed in a scope of radius of the kiln body with an axis of the rotary kiln as a center, and the fume delivery direction in the outlet flue is substantially parallel to the axial direction of the rotary kiln or at an angle of less than 45° relative to the axial direction of the rotary kiln.

In an embodiment of the present invention, the kiln body comprises an external cylinder casing and a kiln liner disposed inside the cylinder casing, the kiln body is divided into a reduction zone and a preheating zone in a lengthwise direction of the rotary kiln, the reduction zone is close to the kiln head box, the preheating zone is close to the kiln tail box, a length of the reduction zone is $1/5$-$3/5$ of a length of the kiln body, and a length of the preheating zone is $2/5$-$2/3$ of the length of the kiln body. The kiln liner mainly comprises a composite refractory brick or a composite refractory pouring material, the kiln liner located in the reduction zone comprises a clay material layer adjacent to the cylinder casing and a high alumina material layer adjacent to an inner cavity of the rotary kiln; the kiln liner located in the preheating zone comprises the clay material layer adjacent to the cylinder casing and a silicon carbide material layer adjacent to the inner cavity of the rotary kiln.

In an embodiment of the present invention, a kiln cleaning machine is disposed externally the kiln tail box, and a scraper is provided in the kiln-cleaning machine to progressively extend into the kiln tail box of the rotary kiln and keep scraping relative to an inner wall of the cavity.

In an embodiment of the present invention, an axis of the rotary kiln forms an angle in a range of 1.2°-2.9° with a horizontal plane; a length-diameter ratio of the kiln body is 10-25:1; a filling rate of the rotary kiln is 7%-25%, and a rotation speed of the rotary kiln is controlled in a range of 0.6 r/min-3 r/min; a thickness of the refractory material of the rotary kiln is 200 mm-280 mm.

The process system of the present invention exhibits a simple structure, a lower investment, flexibility and an excellent cooling effect for the high-temperature slag balls.

The process system and the comprehensive utilization method according to the present invention make full use of residual heat of the high-temperature slag balls, and use the residual heat to replenish heat for reduction reaction in the kiln process for producing phosphoric acid to substantially reduce energy consumption of the rotary kiln, and use the residual heat as a heat source for drying the composite green pellets, whereby thermal energy resource of hot air at different temperatures in different cooling stages are sufficiently used so as to allow for more sufficient utilization of energy in the kiln process for producing the phosphoric acid, substantially reduce energy consumption and substantially enhance economy of the process.

The cooled slag balls are also used efficiently with a high additional value, instead of being directly discharged outside. This not only reduces the solid waste's pollution and destruction to the environment, but also efficiently uses waste resource and thereby improves economic benefit of the kiln process for producing phosphoric acid. The outlet of the fume exhaust pipe at the kiln tail of the rotary kiln is disposed in the same direction as the axis of the rotary kiln (a proper deviation may be permitted to facilitate arrangement of a pipe to the hydration tower) so that the fume exiting the kiln at the tail of the rotary kiln does not deviate much in the movement direction upon entering the outlet flue, thereby preventing metaphosphate generated from reaction of metaphosphoric acid in the fume existing the kiln with dusts from generating physical settlement at the tail of the rotary kiln so that components such as metaphosphoric acid directly enter the hydration tower along with the fume exiting the kiln, then turn into an acid liquor circulation system to generate phosphoric acid and solid slags, then through a corresponding a filtering device exhaust system to prolong a cycle of forming a ring at the kiln tail and improve an operation efficiency of the rotary kiln.

The kiln liner of the kiln tail of the rotary kiln mainly uses a poured body made of a pouring material, a portion of the kiln liner adjacent to the cylinder casing employs a light-weighted temperature-preserving poured liner body made of a light-weighted temperature-preserving pouring material, and a side adjacent to the interior of the rotary kiln employs a silicon carbide-poured liner body made of a silicon carbide pouring material; it is difficult for metaphosphate to react with silicon carbide material, which further eases the issue about ring-forming at the tail of the rotary kiln. A scraper made of heat-resistant stainless steel is mounted at the kiln tail box of the rotary kiln; once the kiln tail ring is formed and causes pellets to return from the kiln tail, fuel supply for heating the rotary kiln is stopped and delivery of pellets into the rotary kiln is stopped, and meanwhile, the scraper may progressively extend into the rotary kiln to cut and scrape away the kiln tail ringing by virtue of rotation of the rotary kiln itself.

LISTING OF PARTS

The reference number 1 denotes a kiln head box; 2 a supporting wheel device; 3 a kiln body; 4 a transmission pinion; 41 a supporting device; 42 a trolley; 43 a housing; 44 a cold air inlet; 45 a first hot air outlet; 46 a second hot air outlet; 47 a partition plate; 48 a chimney; 49 high-temperature slag ball; 5 a driving device; 6 a kiln tail box; 7 an outlet flue; 8 a feed pipe; 9 a kiln tail dynamic seal; 10 a transmission gear; 11 a kiln liner; 12 a cylinder casing; 13 a thermocouple; 14 an air pump; 15 a fuel burner; 16 a silicon carbide material layer; 17 a clay material layer; 18 a high-alumina material layer; 19 a kiln head dynamic seal; 20 a scraper; 21 a platform; 22 a wheel; 23 a travel decelerating motor; 24 a machine frame; 25 a rotation shaft; 26 a supporting truss; 27 a rotary kiln door frame.

EXAMPLES

Example 1

Figure 9:
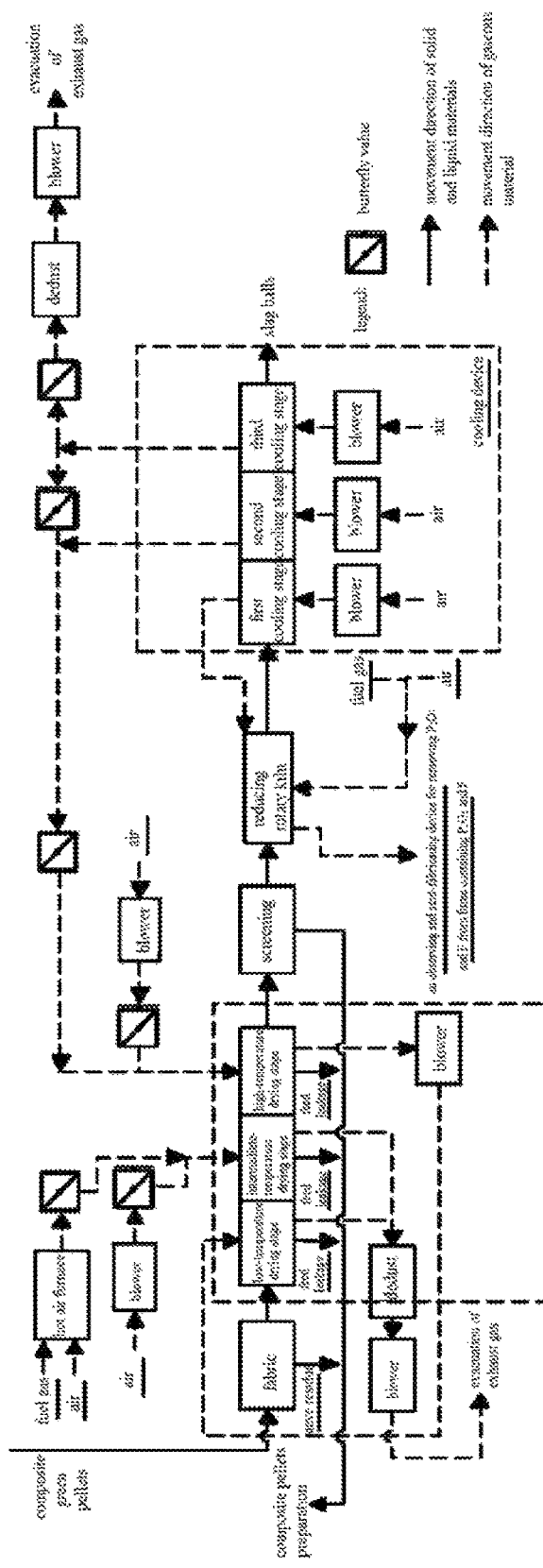
FIG. 9 is a process flow chart of a method of comprehensively utilizing high-temperature slag balls in an embodiment of the present invention.
Figure 10:
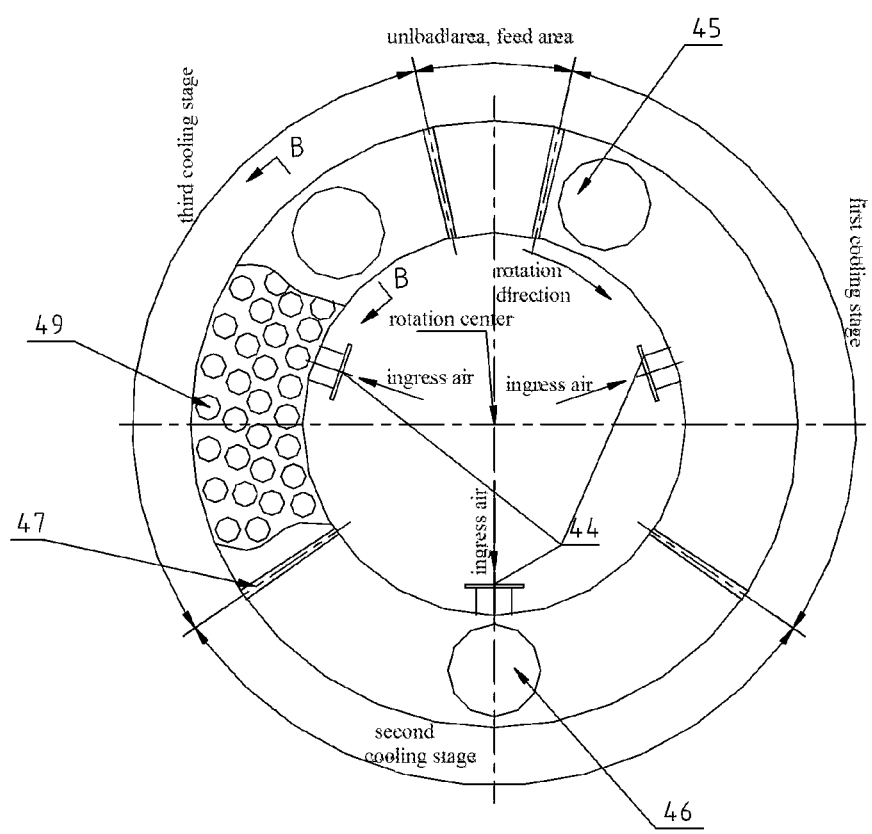
FIG. 10 is an operation schematic diagram (top view) of a device for cooling high-temperate slag balls in an embodiment of the present invention.
Figure 11:
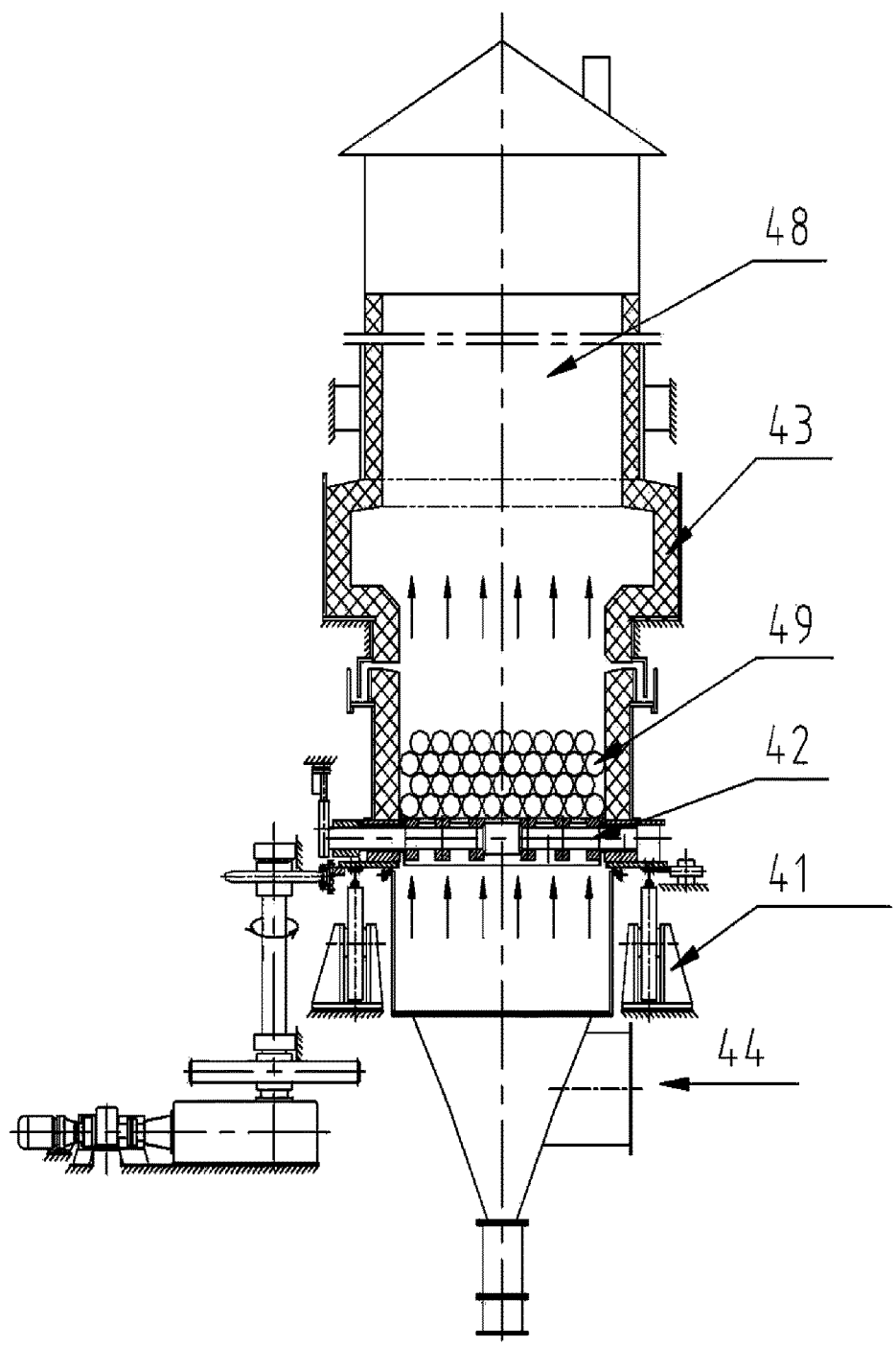
FIG. 11 is a partial sectional view taken along B-B in FIG. 10.

A Process System for Comprehensively Utilizing High-Temperature Slag Balls Exiting a Rotary Kiln in Kiln Process for Producing Phosphoric Acid As shown in FIG. 9, a process system for comprehensively utilizing high-temperature slag balls exiting a rotary kiln in kiln process for producing phosphoric acid comprises a rotary kiln, a cooling device and a dryer for composite green pellets in the kiln process for producing phosphoric acid. As shown in FIG. 10 and FIG. 11, the cooling device comprises a supporting device 41, a trolley 42 and housing 43, wherein the trolley 42 is located on the supporting device 41, the housing 43 is erected above the trolley 43, and a feed area and a unload area of the cooling device are communicated with the trolley 42.

Figure 12:
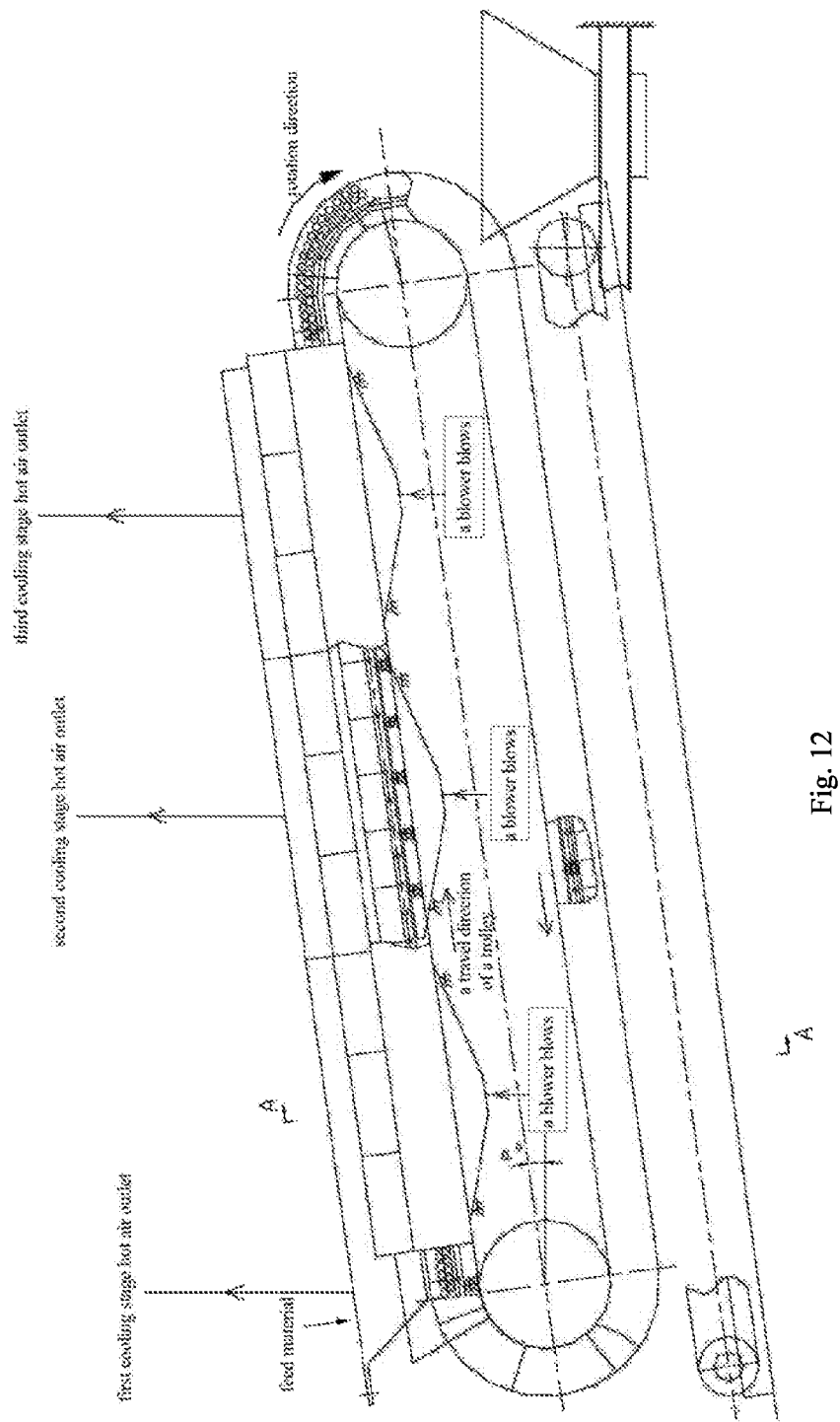
FIG. 12 is an operation schematic diagram of a belt-type cooler in the present invention.
Figure 13:
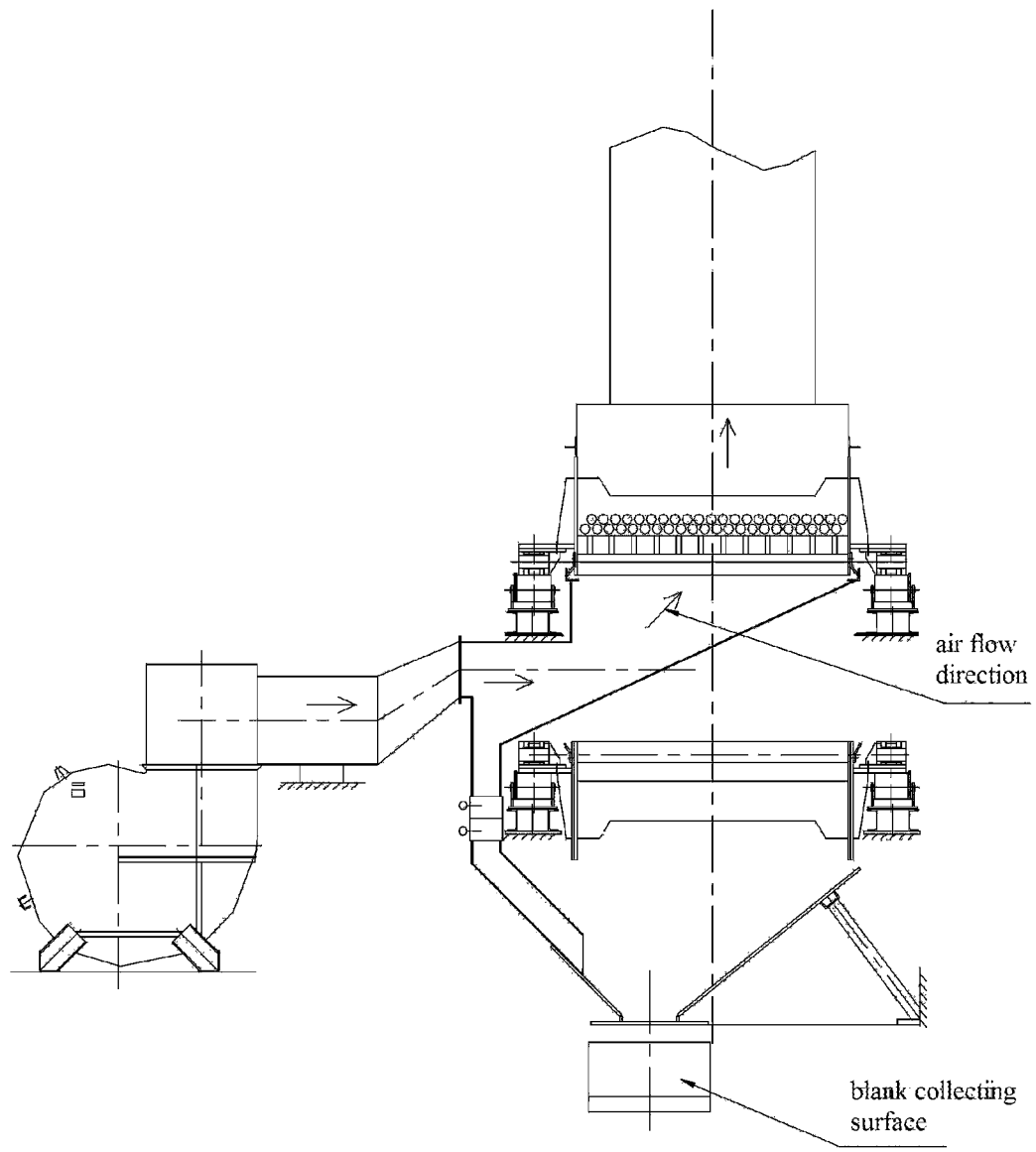
FIG. 13 is a partial sectional view taken along A-A in FIG. 12.

The cooling device is an annular cooler (a belt-type cooler shown in FIG. 12 and FIG. 13 may be employed), and it is divided into three interconnected cooling stages in a circumferential direction; respective cooling stages are separated by a partition plate 47. The cooling stages are respectively provided with a cold air inlet 44 and a hot air outlet corresponding thereto; the cold air inlet 44 is disposed below the trolley 42, and the hot air outlet is disposed above the trolley 42; a gas flow passage between the cold air inlet 44 and hot air outlet passes through the trolley 42; a movement trajectory of the trolley 42 passes by the feed area, a plurality of cold air inlets 44 and the unload area in turn; each cooling stage comprises a first cooling stage adjacent to the feed area and a second cooling stage and a third cooling stage which are connected in turn, a first hot air outlet 45 of the first cooling stage is connected to a cavity of the rotary kiln via a first hot air delivery pipe, and a second hot air outlet 46 of the second cooling stage is connected to the cavity of the dryer via a second hot air delivery pipe; a third hot air outlet is correspondingly disposed in the third cooling stage.

As shown in FIG. 9, the dryer is a scale plate dryer which is divided into three drying stages in a delivery direction of the composite green pellets including a low-temperature drying stage, an intermediate-temperature drying stage and a high-temperature drying stage; a second hot air delivery pipe is connected to the high-temperature drying stage; a wind inlet of the low-temperature drying stage is communicated with a high-temperature hot air outlet of the high-temperature drying stage via a delivery pipe.

Figure 1:
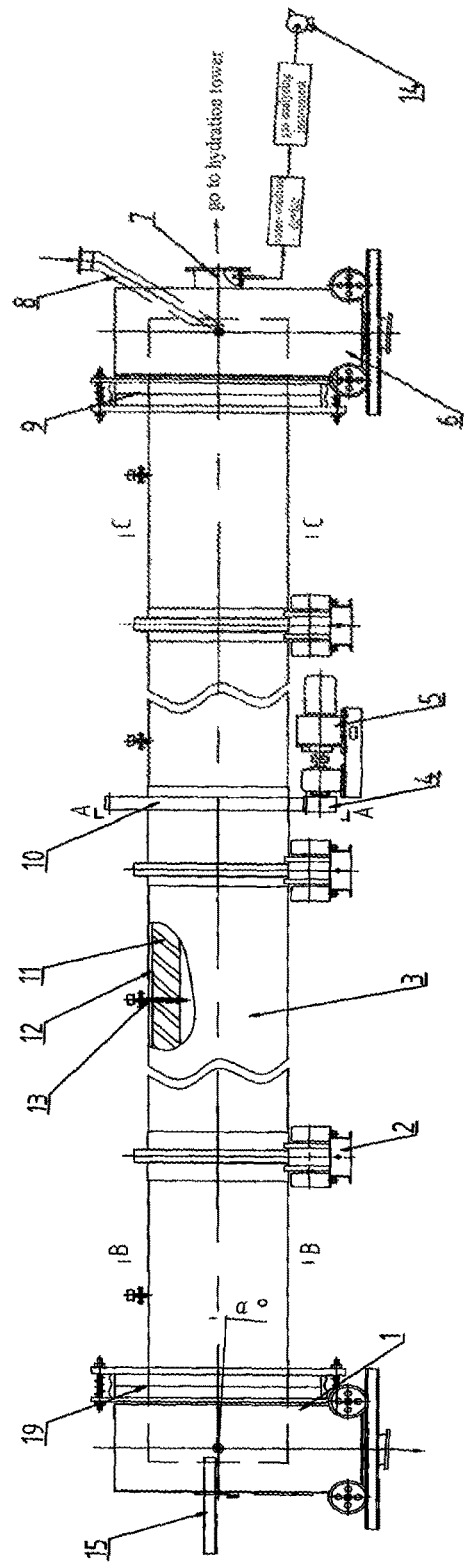
FIG. 1 is a structural schematic view of a rotary kiln according to an embodiment of the present invention.
Figure 2:
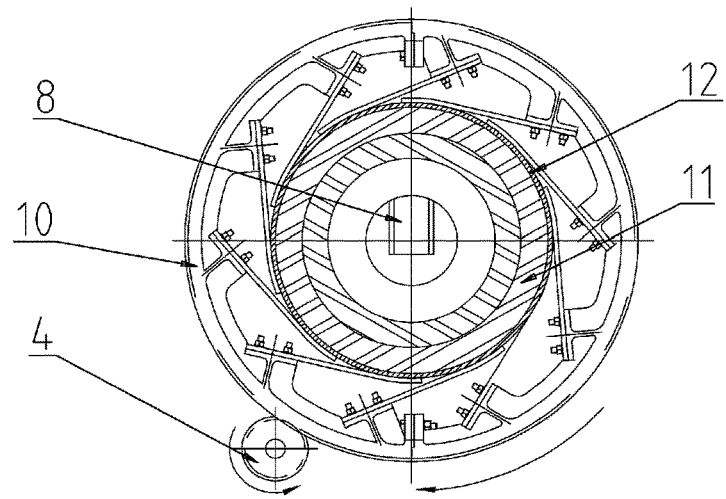
FIG. 2 is an enlarged sectional view taken along A-A in FIG. 1.
Figure 3:
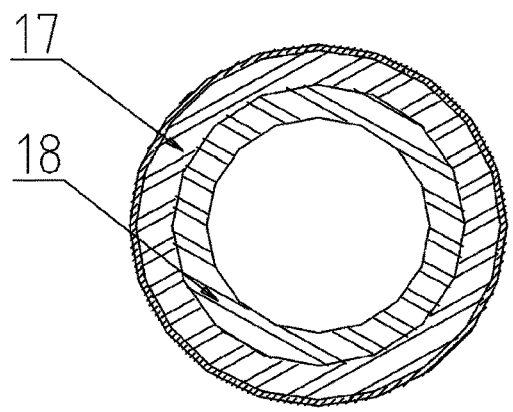
FIG. 3 is an enlarged sectional view taken along B-B in FIG. 1.
Figure 4:
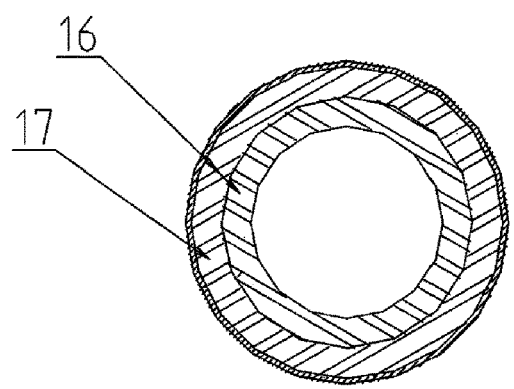
FIG. 4 is an enlarged sectional view taken along C-C in FIG. 1.
Figure 5:
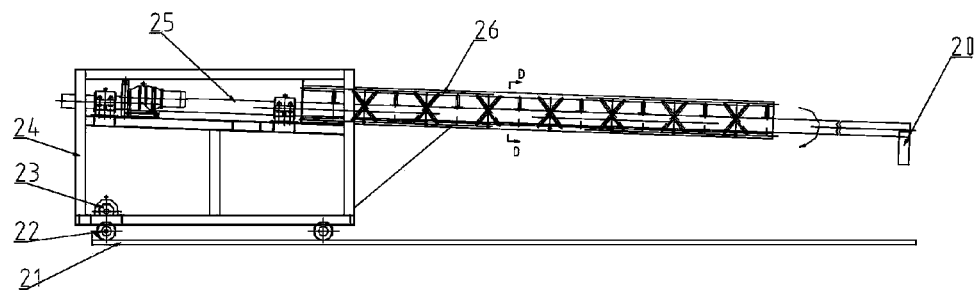
FIG. 5 is a structural schematic view of a kiln cleaning machine according to an embodiment of the present invention.
Figure 6:
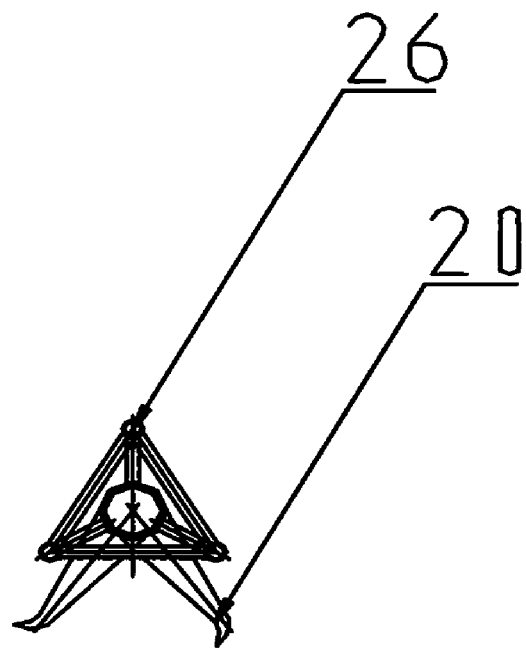
FIG. 6 is a sectional view taken along D-D in FIG. 5.
Figure 7:
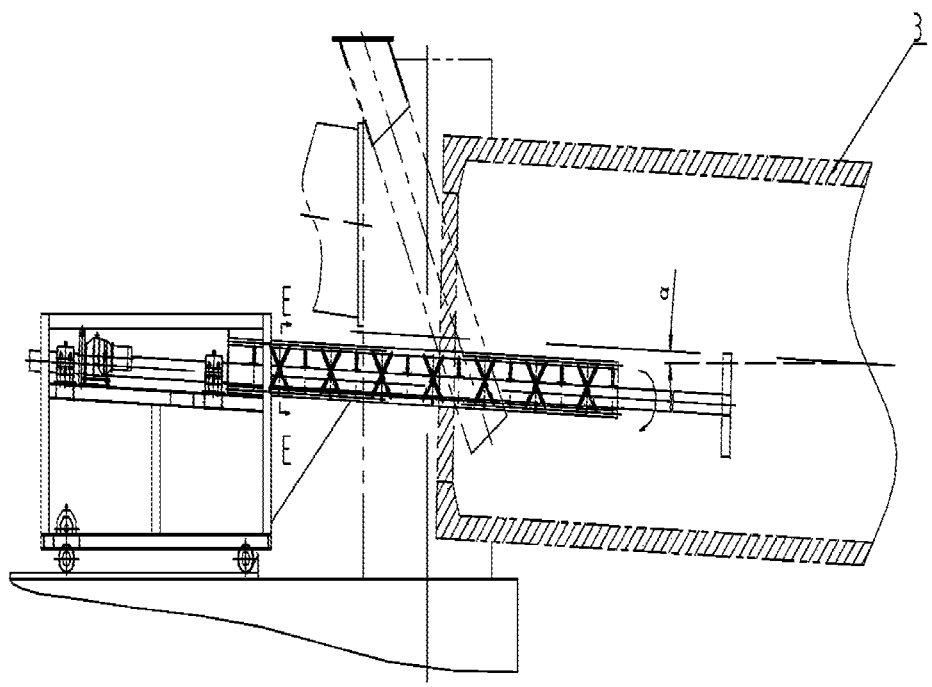
FIG. 7 is a theoretical view of the kiln cleaning machine according to an embodiment of the present invention upon operation.
Figure 8:
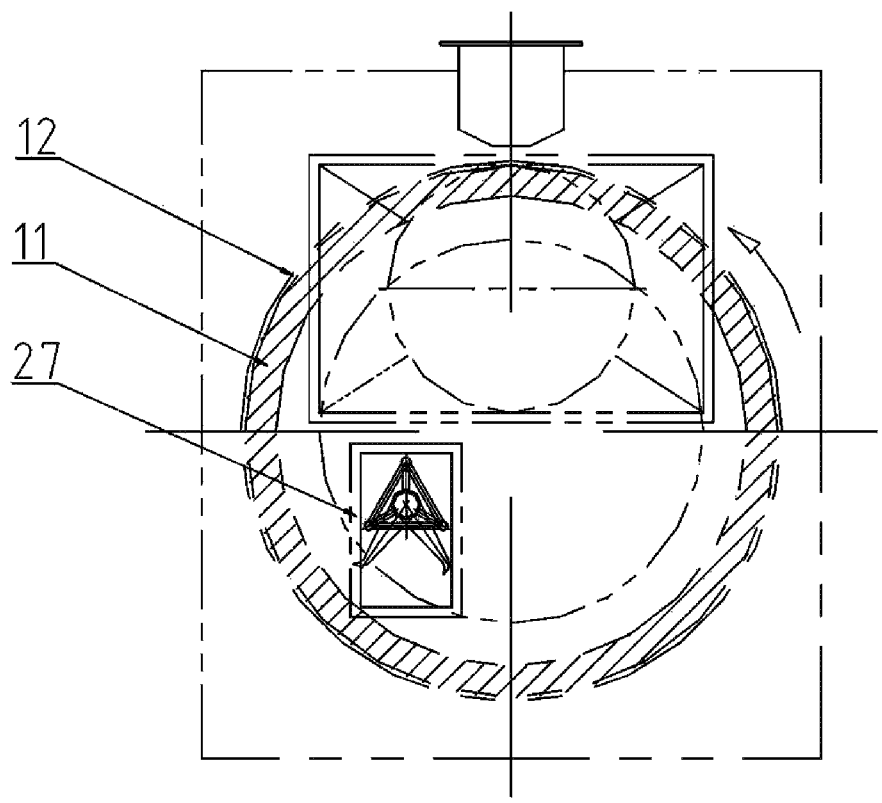
FIG. 8 is a sectional view taken along E-E in FIG. 7.

As shown in FIG. 1 and FIG. 2, the rotary kiln comprises a kiln body 3, a kiln head box 1, a kiln tail box 6 and a driving device 5 for driving the kiln body 3 to rotate, the driving device 5 comprises a motor, a transmission pinion 4 connected with the motor and a transmission gear 10 meshing with the transmission pinion 4, and a supporting wheel device 2 is disposed in the middle of the kiln body 3. A kiln head dynamic seal 19 is employed between the kiln head box 1 and the kiln body 3, and a kiln tail dynamic seal 9 is employed between the kiln tail box 6 and the kiln body 3. At the kiln head of the kiln body 3 are provided a fuel burner 15 and a high-temperature slag ball outlet, at the kiln tail box 6 of the kiln body 3 are provided a feed pipe 8 and an outlet flue 7 connected to an external hydration tower, and the feed pipe 8 is communicated with an inner cavity of the rotary kiln. An upper portion of the kiln body 3 is not provided with a wind tube, the outlet flue 7 is disposed on an axis of the rotary kiln, and a fume delivery direction in the outlet flue 7 is substantially parallel to an axial direction of the rotary kiln. The kiln body 3 comprises an external cylinder casing 12 and a kiln liner 11 disposed inside the cylinder casing 12, the kiln body 3 is divided into a reduction zone and a preheating zone in a lengthwise direction of the rotary kiln, the reduction zone is close to the kiln head box 1, the preheating zone is close to the kiln tail box 6, a length of the reduction zone is ½ of a length of the kiln body 3, and a length of the preheating zone is ½ of the length of the kiln body 3. The kiln liner 11 mainly comprises a composite refractory pouring material, or a composite refractory brick. As shown in FIG. 3, the kiln liner 11 located in the reduction zone comprises a clay material layer 17 adjacent to the cylinder casing 12 and a high alumina material layer 8 (alumina≥65%) adjacent to the inner cavity of the rotary kiln; as shown in FIG. 4, the kiln liner 11 located in the preheating zone comprises the clay material layer 17 adjacent to the cylinder casing 12 and a silicon carbide material layer 16 adjacent to the inner cavity of the rotary kiln.

A kiln cleaning machine is disposed externally the kiln tail box 6. As shown in FIG. 5 through FIG. 8, the kiln cleaning machine is placed on a platform 21, wheels 22 rollable on the platform 21 are provided on a bottom of the kiln cleaning machine, the wheels 22 are driven by a travel decelerating motor 23, a main body of the kiln cleaning machine is a machine frame 24, a rotation shaft 25 driven by a motor is mounted in an upper portion of the machine frame 24, the rotation shaft 25 extends in a substantially horizontal direction out of the machine frame 24, a supporting truss 26 is sleeved around the extended portion, a free end of the extended portion of the rotation shaft 25 is provided with a scraper 20 (which is heat resistant and made of stainless steel) which may progressively extend into the kiln tail box 6 of the rotary kiln and keep scraping relative to an inner wall of the cavity. Once the kiln tail ring is formed and causes pellets to return from the kiln tail, fuel supply for heating the rotary kiln is stopped and delivery of pellets into the rotary kiln is stopped, and meanwhile, the scraper 20 may progressively extend into the rotary kiln to cut and scrape away the kiln tail ringing by virtue of rotation of the rotary kiln itself.

Example 2

Method of Using Process System to Comprehensively Utilize High-Temperature Slag Balls Exiting a Rotary Kiln in Kiln Process for Producing Phosphoric Acid As shown in FIG. 9, a method of using process system to comprehensively utilize high-temperature slag balls exiting a rotary kiln in kiln process for producing phosphoric acid comprises the following steps:

(1) Delivering high-temperature slag balls 49 exiting the rotary kiln in the kiln process for producing phosphoric acid to the feed area of the aforesaid annular cooler, the high-temperature slag balls 49 being delivered on the trolley 42 of the trolley 42 of the annular cooler;

(2) The trolley 42 rotates about a rotation center (the trolley is driven by a motor and a decelerator) to bring the high-temperature slag balls 49 into the first cooling stage in which a blower below the trolley 42 is used to introduce cold air in from the cold air inlet 44, the cold air passes through the trolley 42 located in the first cooling stage and performs heat exchange with the hot slag balls on the trolley 42 and meanwhile the residual carbon not used in the reaction in the high-temperature slag balls 49 burns away; after heat exchange in the first cooling stage, hot air discharged out of the first hot air outlet 45 corresponding to the first cooling stage (a temperature of hot air discharged out of the first hot air outlet 45 is controlled above 600) is delivered through a first hot air delivery pipe into the cavity of the rotary kiln as a hot air source of combustion reduction reaction in the rotary kiln;

(3) The trolley 42 rotates about a rotation center to bring the high-temperature slag balls 49 from the first cooling stage to the second cooling stage in which a blower below the trolley 42 is used to introduce cold air in from the cold air inlet 44, the cold air passes through the trolley 42 located in the second cooling stage and performs heat exchange with the hot slag balls on the trolley 42; after heat exchange of the second stage cooling stage, hot air discharged out of the second hot air outlet 46 corresponding to the second cooling stage (a temperature of hot air discharged out of the second hot air outlet 46 is controlled above 350) is delivered through a second hot air delivery pipe into a composite green pellet dryer in the kiln process for producing phosphoric acid, as a hot air source for drying the composite green pellet;

(4) The trolley 42, through rotation, brings the high-temperature slag balls 49 from the second cooling stage to the third cooling stage in which the blower below the trolley 42 is used to introduce cold air in from the cold air inlet 44, the cold air passes through the trolley 42 located in the third cooling stage and performs heat exchange with the hot slag balls on the trolley 42; after heat exchange, hot air discharged out of a third hot air outlet, after being dedusted, is exhausted through a chimney 48 (or delivered into the dryer); the cooled slag balls are discharged from the unload area. After being discharged from the unload area, the cooled slag balls are used as artificial ceramsites which are directly used as architecture material or used for planting and culturing flowers and green plants; or the cooled slag balls are ground so that above 80 percent of the ground material passes a 100 mesh, and then used as an active material for manufacturing concrete or a blend additive material for manufacturing cement.

The dryer in the present embodiment is a scale plate dryer, hot air entering the intermediate-temperature drying stage, after being moderated by the replenished cold air, becomes intermediate-temperature hot air at a temperature in a range of 150-250; through up-down air pumping or down-up wind blowing, the intermediate-temperature hot air vertically passes through the material layer and performs through-drying for the composite green pellets; hot air entering the high-temperature drying stage, after being moderated by the replenished cold air, becomes high-temperature hot air at a temperature in a range of 200-350; through up-down air pumping or down-up wind blowing, the high-temperature hot air vertically passes through the material layer and performs through-drying for the composite green pellets; low-temperature hot air in a range of 100-200 is introduced into the low-temperature drying stage; through up-down air pumping or down-up wind blowing, the low-temperature hot air is made vertically pass through the material layer and perform through-drying for the composite green pellets; the low-temperature hot air originates from exhaust gas discharged at the high-temperature hot air outlet of the high-temperature drying stage.

In addition, the aforesaid rotary kiln employing the process system of the present embodiment may effectively solve the ring forming problem at the tail of the kiln for producing phosphoric acid. A specific operation is as follows: the aforesaid rotary kiln is used to perform the kiln process for producing phosphoric acid, the raw materials are enabled to enter the cavity of the rotary kiln through the feed pipe 8 at the kiln tail of the rotary kiln, the fuel burner 15 is ignited to heat the reduction zone in the rotary kiln to 1300-1450, the phosphate ore raw material in the rotary kiln is reducing by the reducing agent at a high temperature to generate kiln fume, an outlet of the outlet flue at the kiln tail of the rotary kiln is disposed in the same direction as an axis of the rotary kiln (namely, disposed parallel to the axis of the rotary kiln) so that the fume exiting the kiln at the tail of the rotary kiln does not deviate much in the movement direction upon entering the outlet flue 7, thereby preventing metaphosphoric acid in the fume existing the kiln from generating centrifugal physical settlement at the tail of the rotary kiln so that the metaphosphoric acid in the kiln gas directly enters a subsequent hydration tower along with the fume exiting the kiln and becomes orthophosphoric acid after meeting water. Furthermore, in the present embodiment, the kiln liner 11 located at the preheating zone of the rotary kiln is made of a bi-layered composite refractory pouring material (or composite refractory brick), a portion of the kiln liner adjacent to the cylinder casing 12 of the rotary kiln employs a clay material to produce the clay material layer 17, and a portion of the kiln liner adjacent to the inner cavity of the rotary kiln employs a silicon carbide material to produce the silicon carbide material layer 16. Since it is difficult that the metaphosphate reacts with the silicon carbide material, this allows the metaphosphate deposited on the preheating zone kiln liner 11 of the rotary kiln due to reaction to less adhere to the kiln liner 11. Such kiln liner structure may further stop the metaphosphate from reacting and forming ring with the kiln liner 11, make it fall off on its own, and further ease occurrence of ring forming at the kiln tail. Furthermore, the scraper 20 made of heat-resistant stainless steel is mounted in a kiln cleaning machine disposed external of the kiln tail box 6 of the rotary kiln of the present embodiment, and the scraper 20 is a scraper that may progressively extend into the kiln tail box 6 of the rotary kiln and keep scraping relative to the inner wall of the cavity; when the ring-forming at the tail of the rotary kiln causes pellets of the raw materials to return materials outside the rotary kiln from the kiln tail, fuel supply for heating the rotary kiln is stopped first, meanwhile delivery of the material balls into the rotary kiln is stopped, the material balls in the rotary kiln are emptied, then the scraper 20 in the kiln cleaning machine is made extend gradually from a rotary kiln door frame 27 into the rotary kiln, and then the ring formed at the kiln tail are cut and scraped away by virtue of rotation of the rotary kiln itself. As can be seen from the above, the rotary kiln, through multiple guarantee measures and technical means, effectively eases the issue about ring-forming at the tail of the rotary kiln in the kiln process for producing phosphoric acid.

In addition, a plurality of thermocouples 13 for monitoring the in-kiln temperature are mounted in the lengthwise direction of the kiln body 3 of the rotary kiln, and the thermocouples 13 are coupled to a temperature control device and a temperature display device outside the rotary kiln via an electrically conductive ring or a wireless transmitting and receiving device. With the thermocouples 13 being disposed, it can be ensured that a temperature requirement be set for reaction wherein a maximum temperature of the composite pellets whose inner pellet material $CaO/SiO_2$ mole ratio is less than 0.6 does not exceed 1370, and a temperature requirement be set for reaction wherein a maximum temperature of the composite pellets whose inner pellet material $CaO/SiO_2$ mole ratio is greater than 6.5 does not exceed 1450. The kiln head of the rotary kiln is mounted with an industrial television for monitoring conditions in the rotary kiln.

Additionally, an air pump 14 for extracting air sample is mounted on the outlet flue 7 at the outlet of the kiln tail box 6 of the rotary kiln. The air sample collected by the air pump 14, after being washed with water and dedusted, is fed into a CO and $O_2$ gas analyzing instrument to monitor CO and $O_2$ content of the outlet fume of the rotary kiln so as to better control a range of content of CO and $O_2$ of the fume existing the kiln, generally 0-5%.

In the present embodiment, an axis of the rotary kiln forms an angle α in a range of 2.3° with a horizontal plane, a length-diameter ratio of the kiln body 3 is 15:1, a filling rate of the rotary kiln is 13%, and a rotation speed of the rotary kiln is controlled in a range of 1 r/min. A thickness of the refractory material of the rotary kiln is 220 mm.

The invention claimed is:

1. A method of comprehensively utilizing high-temperature slag balls exiting a rotary kiln in a kiln process for producing phosphoric acid, comprising the following steps:
   (1) delivering high-temperature slag ball exiting the rotary kiln in the kiln process for producing phosphoric acid to a feed area of a cooling device; the cooling device is divided into at least two interconnected cooling stages;
   (2) bringing the high-temperature slag balls into a first cooling stage; after heat exchange in the first cooling stage, using hot air from the first cooling stage as a hot air source for burning a reduction reaction product in the rotary kiln;
   (3) bringing the high-temperature slag balls from the first cooling stage to a second cooling stage; after heat exchange of the second stage cooling stage, using hot air from the second cooling stage as a hot air source for drying the composite green pellet;
   (4) discharging cooled slag balls from the unload area.

2. The method according to claim 1, wherein, the step (1) comprising: delivering high-temperature slag ball exiting the rotary kiln in the kiln process for producing phosphoric acid to a feed area of a cooling device, the cooling device comprises a supporting device, a trolley and a housing, the trolley is located on the supporting device, the housing is erected above the trolley, the feed area and a unload area of the cooling device are both communicated with the trolley, and the high-temperature slag balls are delivered onto the trolley of the cooling device; the cooling device is divided into at least two interconnected cooling stages, each cooling stage is provided with a cold air inlet and a hot air outlet corresponding there to; a gas flow passage between the cold air inlet and the hot air outlet passes through the trolley; a movement trajectory of the trolley passes by the feed area, a plurality of cold air inlets and the unload area in turn.

3. The method according to claim 2, wherein, the step (2) comprising: the trolley rotates to bring the high-temperature slag balls into a first cooling stage in which a blower below the trolley is used to introduce cold air in from the cold air inlet, the cold air passes through the trolley located in the first cooling stage and performs heat exchange with the hot slag balls on the trolley and meanwhile residual carbon not used in the reaction in the high-temperature slag balls burns away; after heat exchange in the first cooling stage, hot air discharged out of the first hot air outlet corresponding to the first cooling stage is delivered through a first hot air delivery pipe to a cavity of the rotary kiln as a hot air source for burning a reduction reaction product in the rotary kiln.

4. The method according to claim 3, wherein, the step (3) comprising: the trolley rotates to bring the high-temperature slag balls from the first cooling stage to a second cooling stage in which a blower below the trolley is used to introduce cold air in from the cold air inlet, the cold air passes through the trolley located in the second cooling stage and performs heat exchange with the hot slag balls on the trolley; after heat exchange in the second stage cooling stage, hot air discharged out of the second hot air outlet corresponding to the second cooling stage is delivered through a second hot air delivery pipe into a composite green pellet dryer in the kiln process for producing phosphoric acid, as a hot air source for drying the composite green pellet.

5. The method according to claim 4, wherein, the step (3) comprising: through rotation, the trolley further brings the high-temperature slag balls from the second cooling stage to subsequent remaining cooling stages in which the blower below the trolley is used to introduce cold air in from the cold air inlet, the cold air passes through the trolley located in the remaining cooling stages and performs heat exchange with the hot slag balls on the trolley; after heat exchange in the remaining cooling stages, hot air discharged out of remaining hot air outlets, after being dedusted, may be directly discharged or delivered into the composite green pellets dryer as a hot air source for drying the composite green pellet; the cooled slag balls are discharged from the unload area.

6. The method according to claim 5, the temperature of hot air discharged out of the first hot air outlet is controlled above 600° C., and a temperature of hot air discharged out of the second hot air outlet is controlled above 350° C.

7. The method according to claim 6, the dryer is a scale plate dryer, the scale plate dryer is divided into a total of three drying stages in a delivery direction of the composite green pellets including a low-temperature drying stage, an intermediate-temperature drying stage and a high-temperature drying stage; hot air discharged out of the second hot air outlet is delivered through the second hot air delivery pipe to the intermediate-temperature drying stage and/or high-temperature drying stage;

hot air entering the intermediate-temperature drying stage, after being moderated by replenished cold air, becomes intermediate-temperature hot air at a temperature in a range of 150-250° C.; through up-down air pumping or down-up wind blowing, the intermediate-temperature hot air vertically passes through a material layer and performs through-drying for composite green pellets;

hot air entering the high-temperature drying stage, after being moderated by the replenished cold air, becomes high-temperature hot air at a temperature in a range of 200-350° C.; through up-down air pumping or down-up wind blowing, the high-temperature hot air is made vertically pass through the material layer and performs through-drying for the composite green pellets;

the low-temperature hot air in a range of 100-200° C. is introduced into the low-temperature drying stage; through up-down air pumping or down-up wind blowing, the low-temperature hot air is made vertically pass through the material layer and perform through-drying for the composite green pellets; the low-temperature hot air originates from exhaust gas discharged at the high-temperature hot air outlet of the high-temperature drying stage.

8. The method according to claim 1, the cooled slag balls discharged out of the unload area are used as artificial ceramsites, and the said ceramsites are directly used as architecture material or used for planting and culturing flowers and green plants; or the cooled slag balls discharged out of the unload area are ground so that above 80 percent of the ground material passes 100 mesh, and then used as an active material for manufacturing concrete or a blending material for manufacturing cement.

9. The method according to claim 1, the cooling device is an annular cooler or a belt-type cooler, the cold air inlet is disposed below the trolley, and the hot air outlet is disposed above the trolley; the annular cooler is divided into 2-5 interconnected cooling stages in a circumferential direction; respective cooling stages are separated by a partition plate; the belt-type cooler is divided into 2-5 interconnected cooling stages in a lengthwise direction; respective cooling stages are separated by a partition plate.

\* \* \* \* \*